US011001950B2

(12) United States Patent
Lima

(10) Patent No.: US 11,001,950 B2
(45) Date of Patent: May 11, 2021

(54) TEAR RESISTANT NANOFIBER SHEET

(71) Applicant: Lintec of America, Inc., Richardson, TX (US)

(72) Inventor: Marcio D. Lima, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 16/364,955

(22) Filed: Mar. 26, 2019

(65) Prior Publication Data

US 2019/0352822 A1 Nov. 21, 2019

Related U.S. Application Data

(60) Provisional application No. 62/672,820, filed on May 17, 2018.

(51) Int. Cl.
*B32B 5/10* (2006.01)
*B32B 5/26* (2006.01)
(Continued)

(52) U.S. Cl.
CPC .............. *D04H 5/04* (2013.01); *B32B 5/022* (2013.01); *B32B 5/024* (2013.01); *B32B 5/10* (2013.01);
(Continued)

(58) Field of Classification Search
CPC ......... B32B 5/10; B32B 5/26; B32B 2250/20; B32B 2260/023; B32B 2262/106;
(Continued)

(56) References Cited

U.S. PATENT DOCUMENTS 5,168,011 A 12/1992 Kovar et al.
6,265,333 B1 * 7/2001 Dzenis .................. B32B 5/28
442/346
(Continued)

FOREIGN PATENT DOCUMENTS

KR 20090030727 A 3/2009

OTHER PUBLICATIONS

International Search Report and Written Opinion received for PCT/US2019/024040, dated Jul. 12, 2019. 11 pages.
(Continued)

*Primary Examiner* — Joanna Pieszcynska
(74) *Attorney, Agent, or Firm* — Greenblum & Bernstein, P.L.C.

(57) ABSTRACT

One or more nanofiber yarns can be placed in contact with one or more nanofiber sheets. The nanofiber yarns, which include single-ply and multi-ply nanofiber yarns, provide added mechanical stability to a nanofiber sheet that decreases the likelihood of a nanofiber sheet wrinkling, folding, or otherwise becoming stuck to itself. Furthermore, the nanofiber yarns integrated with the nanofiber sheet can also act as a mechanism to prevent the propagation of tears through the nanofiber sheet. In some cases, an infiltrating material can be infiltrated into interstitial spaces defined by the nanofibers within both the nanofiber yarns and the nanofiber sheets. The infiltrating material can then form a continuous network throughout the nanofiber yarns and the nanofiber sheet.

22 Claims, 6 Drawing Sheets

(51) Int. Cl.
- B32B 5/28 (2006.01)
- B29C 70/34 (2006.01)
- B32B 38/08 (2006.01)
- D04H 1/64 (2012.01)
- D04H 5/04 (2006.01)
- D04H 1/74 (2006.01)
- D06M 10/10 (2006.01)
- D04H 1/4242 (2012.01)
- D04H 5/08 (2012.01)
- B32B 5/02 (2006.01)
- B32B 37/12 (2006.01)
- B32B 37/24 (2006.01)
- B32B 27/12 (2006.01)
- D06M 15/19 (2006.01)
- D06M 101/40 (2006.01)

(52) U.S. Cl.
CPC ............... *B32B 5/26* (2013.01); *B32B 27/12* (2013.01); *B32B 37/1284* (2013.01); *B32B 37/24* (2013.01); *B32B 38/08* (2013.01); *D04H 1/4242* (2013.01); *D04H 1/64* (2013.01); *D04H 1/74* (2013.01); *D04H 5/08* (2013.01); *D06M 10/10* (2013.01); *D06M 15/19* (2013.01); *B32B 2250/20* (2013.01); *B32B 2260/023* (2013.01); *B32B 2260/046* (2013.01); *B32B 2262/106* (2013.01); *B32B 2305/07* (2013.01); *B32B 2305/10* (2013.01); *B32B 2305/28* (2013.01); *B32B 2307/516* (2013.01); *B32B 2307/5825* (2013.01); *B32B 2313/04* (2013.01); *D06M 2101/40* (2013.01); *D10B 2401/063* (2013.01)

(58) Field of Classification Search
CPC .. B32B 2260/021; D04H 1/4242; D04H 1/64; B29C 70/34
See application file for complete search history.

(56) References Cited

U.S. PATENT DOCUMENTS

| | | | |
|---|---|---|---|
| 9,233,492 | B2 | 1/2016 | Zhang et al. |
| 2006/0192373 | A1 | 8/2006 | Manley |
| 2010/0209659 | A1* | 8/2010 | Boskovic ............. B32B 5/26 428/113 |
| 2012/0294659 | A1 | 11/2012 | Lee et al. |
| 2015/0044383 | A1 | 2/2015 | Kim et al. |
| 2017/0137290 | A1 | 5/2017 | Zhang et al. |

OTHER PUBLICATIONS

Invitation to Pay Additional Fees received PCT/US2019/024040, dated May 10, 2019. 3 pages.

* cited by examiner

TEAR RESISTANT NANOFIBER SHEET

TECHNICAL FIELD

The present disclosure relates generally to nanofibers. Specifically, the present disclosure is directed to tear resistant nanofiber sheets

BACKGROUND

Nanofiber forests, composed of both single wall and multiwalled nanotubes, can be drawn into nanofiber ribbons or sheets. In its pre-drawn state, the nanofiber forest comprises a layer (or several stacked layers) of nanofibers that are parallel to one another and perpendicular to a surface of a growth substrate. When drawn into a nanofiber sheet, the orientation of the nanofibers changes from perpendicular to parallel relative to the surface of the growth substrate. The nanotubes in the drawn nanofiber sheet connect to one another in an end-to-end configuration to form a continuous sheet in which a longitudinal axis of the nanofibers is parallel to a plane of the sheet (i.e., parallel to both of the first and second major surfaces of the nanofiber sheet). The nanofiber sheet can be treated in any of a variety of ways, including spinning the nanofiber sheet into a nanofiber yarn.

SUMMARY

Example 1 is a nanofiber sheet assembly comprising: a nanofiber yarn having a circumference and a length; a nanofiber sheet in direct contact with the nanofiber yarn; and an infiltrating material disposed within the nanofiber yarn and the nanofiber sheet.

Example 2 includes the subject matter of Example 1, wherein the nanofiber sheet is in direct contact with at least half of the circumference of the nanofiber yarn along at least some of the length of the nanofiber yarn.

Example 3 includes the subject matter of either Example 1 or Example 2, wherein a portion of the nanofiber sheet conforms to a surface topography of the nanofiber yarn.

Example 4 includes the subject matter of Example 3, wherein the nanofiber sheet is in direct contact with at least 75% of the circumference of the nanofiber yarn.

Example 5 includes the subject matter of Example 3, wherein the nanofiber sheet is in direct contact with at least 90% of the circumference of the nanofiber yarn.

Example 6 includes the subject matter of any of the preceding Examples, wherein the nanofiber yarn comprises a plurality of nanofiber yarns.

Example 7 includes the subject matter of Example 6, wherein the plurality of nanofiber yarns are configured into a parallel array.

Example 8 includes the subject matter of Example 6, wherein the plurality of nanofiber yarns are woven into an orthogonal array.

Example 9 includes the subject matter of any of the preceding Examples, wherein the infiltrating material is disposed within a first plurality of interstitial spaces defined by nanofibers within the nanofiber yarn and a within a second plurality of interstitial spaces defined by nanofibers within the nanofiber sheet.

Example 10 includes the subject matter of Example 9, wherein the infiltrating material forms a continuous network connecting the nanofiber yarn and the nanofiber sheet.

Example 11 includes the subject matter of any of the preceding Examples, wherein the infiltrating material is a polymer.

Example 12 includes the subject matter of Example 11, wherein the polymer is a thermoplastic polymer.

Example 13 includes the subject matter of Example 11, wherein the polymer is a network polymer.

Example 14 includes the subject matter of Example 13, wherein the polymer is an elastomeric network polymer.

Example 15 includes the subject matter of any of the preceding Examples, wherein the nanofiber sheet is a first nanofiber sheet in contact with a first portion of the circumference of the length of the nanofiber yarn and a second nanofiber sheet in contact with a second portion of the circumference of the length of the nanofiber yarn, the first portion and the second portion comprising greater than 95% of the circumference.

Example 16 includes the subject matter of any of the preceding Examples, further comprising a polymer sheet connected to an assembly of the nanofiber yarn, the nanofiber sheet, and the infiltrating material.

Example 17 includes the subject matter of any of the preceding Examples, wherein a thickness of the nanofiber sheet is less than 0.1 µm.

Example 18 includes the subject matter of any of the preceding Examples, wherein a diameter of the nanofiber yarn is less than 5 µm.

Example 19 includes the subject matter of any of the preceding Examples, wherein both the nanofiber yarn and the nanofiber sheet comprise carbon nanofibers.

Example 20 is a method for fabricating a nanofiber sheet assembly comprising: providing a nanofiber yarn having a circumference and a length; placing a nanofiber sheet and the nanofiber yarn in contact with one another; and infiltrating an infiltration material into both of the nanofiber yarn and the nanofiber sheet to form a continuous network of the infiltration material throughout both of the nanofiber yarn and the nanofiber sheet.

Example 21 includes the subject matter of Example 20, further comprising causing the nanofiber sheet to conform to at least half of the circumference of the nanofiber yarn along at least a portion of the length of the nanofiber yarn.

Example 22 includes the subject matter of Example 21, wherein causing the nanofiber sheet to conform includes causing the nanofiber sheet to conform to a surface topography of the nanofiber yarn.

Example 23 includes the subject matter of either of Example 20 or Example 21, further comprising attaching a polymer sheet to an assembly of the nanofiber sheet, the nanofiber yarn, and the continuous network of the infiltrating material.

Example 24 includes the subject matter of any of Examples 20 to 23, wherein the nanofiber sheet is in direct contact with at least 75% of the circumference of the nanofiber yarn.

Example 25 includes the subject matter of any of Examples 20 to 24, wherein the nanofiber sheet is in direct contact with at least 90% of the circumference of the nanofiber yarn.

Example 26 includes the subject matter of any of 20 to 25, wherein the infiltrating comprises infiltrating the infiltration material within a first plurality of interstitial spaces defined by nanofibers within the nanofiber yarn and a within a second plurality of interstitial spaces defined by nanofibers within the nanofiber sheet.

BRIEF DESCRIPTION OF THE DRAWINGS

FIG. 5B' is a magnified cross-sectional view of a portion of the nanofiber assembly of FIG. 5B, in an embodiment.

Figure 1:
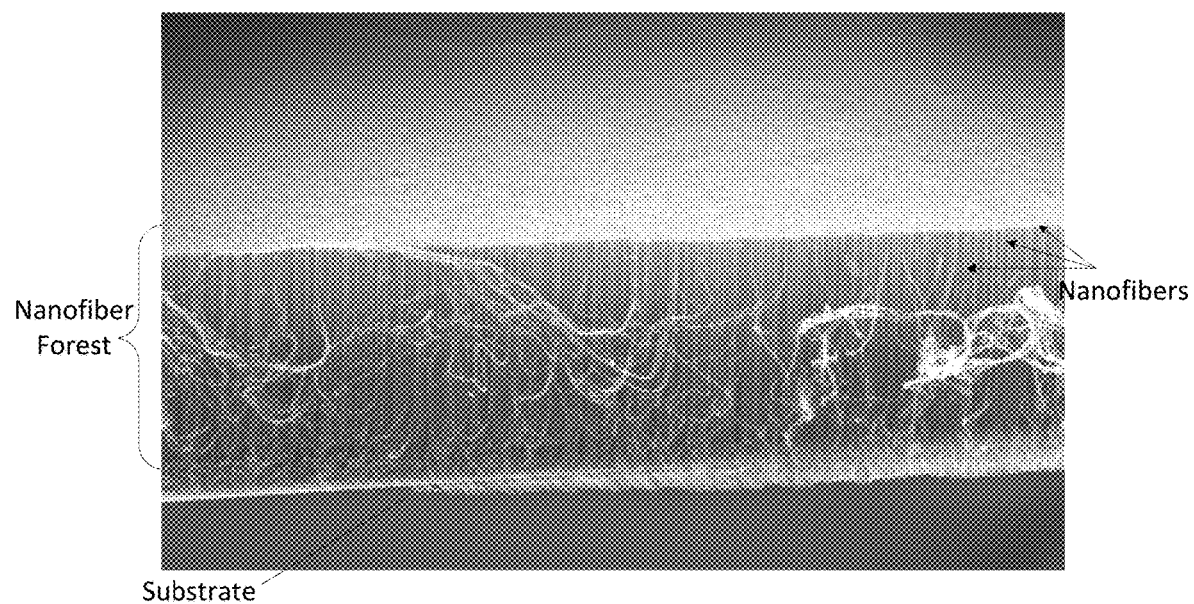
FIG. 1 is a photomicrograph of an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Nanofibers, and in a particular carbon nanofibers, that have been grown on a substrate in a "forest" configuration can be conveniently drawn into a nanofiber sheet directly from the forest. These nanofiber sheets, described below in more detail, have a variety of novel and unexpected electrical, optical, and thermal properties. However, because (in part) the nanofiber sheets drawn from the forest are thin (sometimes less than 1 µm, 0.5 µm, or 0.1 µm thick), they are often mechanically delicate and prone to tearing, wrinkling, or irreversibly becoming folded and attached to itself, thus making the sheet less technologically useful or at least more difficult to integrate into a manufacturing process.

Embedding the nanofiber sheet within a polymer matrix can provide some improvement in mechanical stability to the nanofiber sheet. The added thickness and rigidity of a polymer layer in which a nanofiber sheet is embedded or encapsulated prevents the nanofiber sheet from wrinkling, folding, or otherwise contacting itself in response to even minor perturbations (e.g., gusts of air caused by the opening of the door or a change in pressure within a room). However, embedding a nanofiber sheet in a polymer matrix is sometimes inadequate to prevent a tear for propagating through the nanofiber sheet. This is particularly true for technological applications that call for a thin composite (e.g., that might require a thin (e.g., less than 5 µm) polymer matrix). In this configuration, the polymer matrix may be insufficient to prevent tearing, folding, or wrinkling.

Encapsulating the nanofiber sheet within a thick polymer sheet to form a thick composite sheet presents its own challenges. For example, polymer molecules can detract from many of the advantageous properties exhibited by an unencapsulated nanofiber sheet (sometimes referred to as a "native" or "neat" nanofiber sheet). For example, electrical conductivity and thermal conductivity of the nanofiber sheet is reduced when a nanofiber sheet is coated with or encapsulated within an electrically and thermally insulating polymer. In another example, some technological applications of carbon nanofiber sheets take advantage of the inherent transparency of a carbon nanofiber sheet to a wide range of electromagnetic radiation wavelengths. Many of these wavelengths are absorbed or blocked by the presence of a polymer, thus depriving the nanofiber sheet of this advantageous property.

Thus, in accordance with embodiments of the present disclosure, techniques are described for integrating one or more nanofiber yarns with one or more nanofiber sheets. The nanofiber yarns, which can include a single nanofiber yarn ("single-ply yarn") or multiple nanofiber yarns plied together ("multi-ply yarn"), provide added mechanical stability and toughness to a nanofiber sheet. The integration of the nanofiber yarns and the nanofiber sheet decreases the likelihood of the nanofiber sheet tearing, wrinkling, folding, or becoming stuck to itself. Because nanofiber yarns and nanofiber sheets are fabricated from the same material (e.g., carbon nanotubes or carbon nanofibers), the unexpected and/or advantageous properties are maintained. In an alternative embodiment, an infiltrating material can be infiltrated into interstitial spaces defined by the nanofibers within the nanofiber yarns and the nanofiber sheets. The infiltrating material can then form a continuous network throughout the nanofiber yarns and the nanofiber sheet. Infiltrating a material into the combined nanofiber yarns and the nanofiber sheets can improve the mechanical durability of the assembled yarns and sheets while still preserving many of the unexpected properties.

Prior to describing embodiments of the present disclosure in detail, a discussion of nanofiber forests and nanofiber sheets follows.

Nanofiber Forests

As used herein, the term "nanofiber" means a fiber having a diameter less than 1 µm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 µm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm2. In some specific embodiments, a nanofiber forest as described herein may have a density of between 10 billion/cm2 and 30 billion/cm2. In other examples, the nanofiber forest as described herein may have a density in the range of 90 billion nanofibers/cm2. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
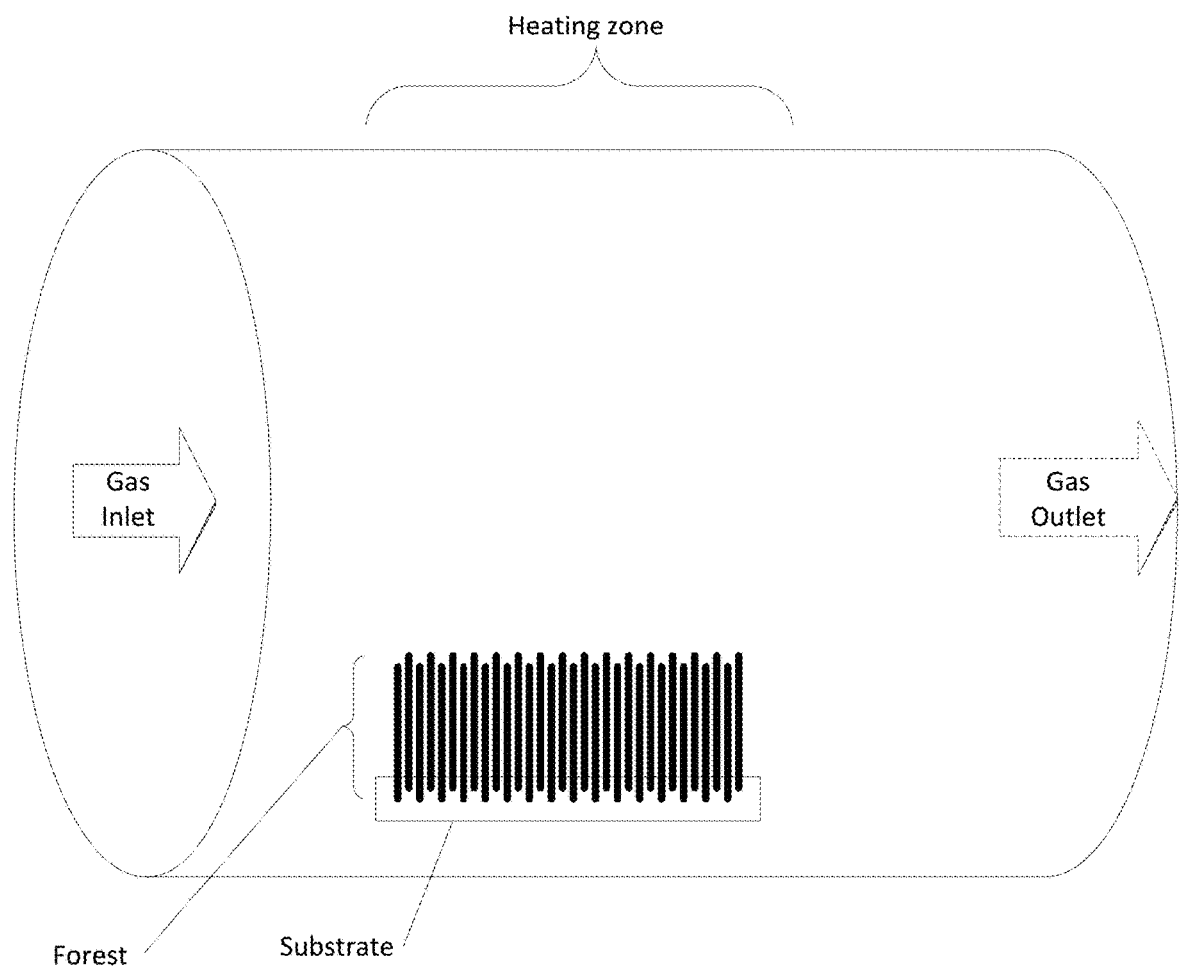
FIG. 2 is a schematic illustration of an example reactor for nanofiber growth, in an embodiment.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
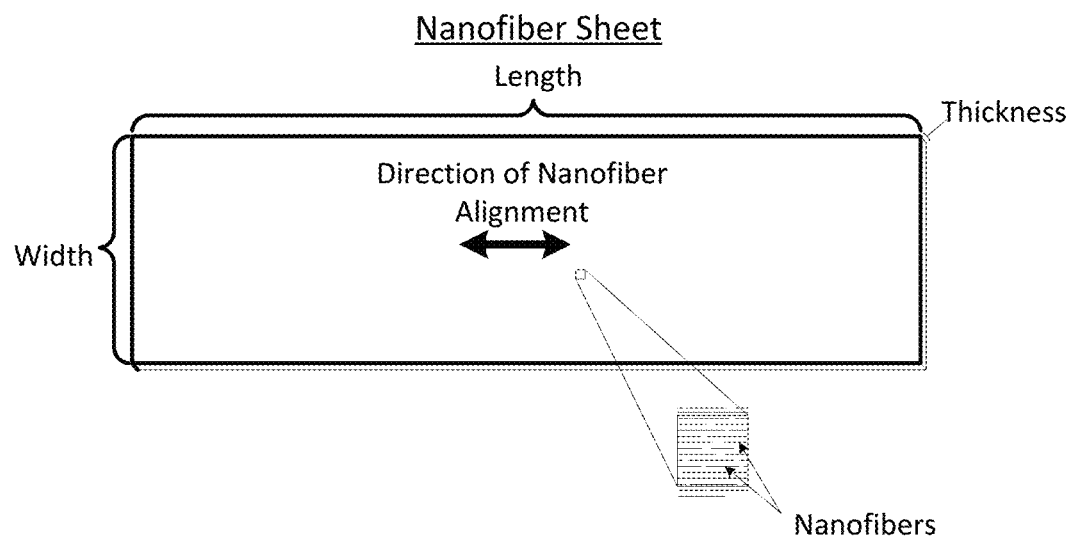
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
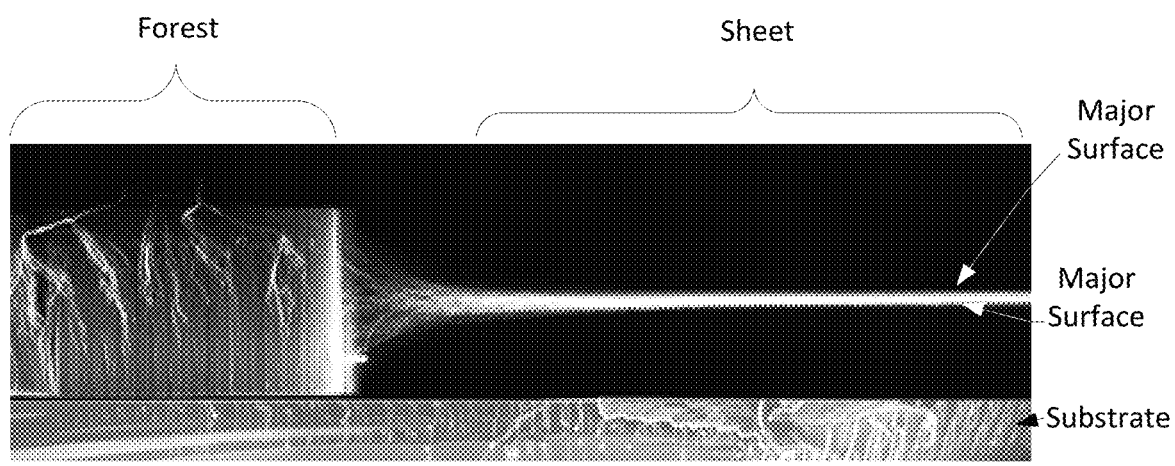
FIG. 4 is an SEM photomicrograph is an image of a nanofiber sheet being laterally drawn from a nanofiber forest, the nanofibers aligning from end-to-end as schematically.

As can be seen in FIG. 4, the nanofibers may be drawn laterally from the forest and align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Tear Resistant Nanofiber Sheets

As indicated above, some embodiments of the present disclosure include a nanofiber sheet reinforced by one or more nanofiber yarns. As also indicated above, the nanofiber yarns can be single-ply (e.g., a single strand of twisted nanofibers) or multi-ply (e.g., more than one single-ply yarn, all of which have been plied together).

Figure 5A:
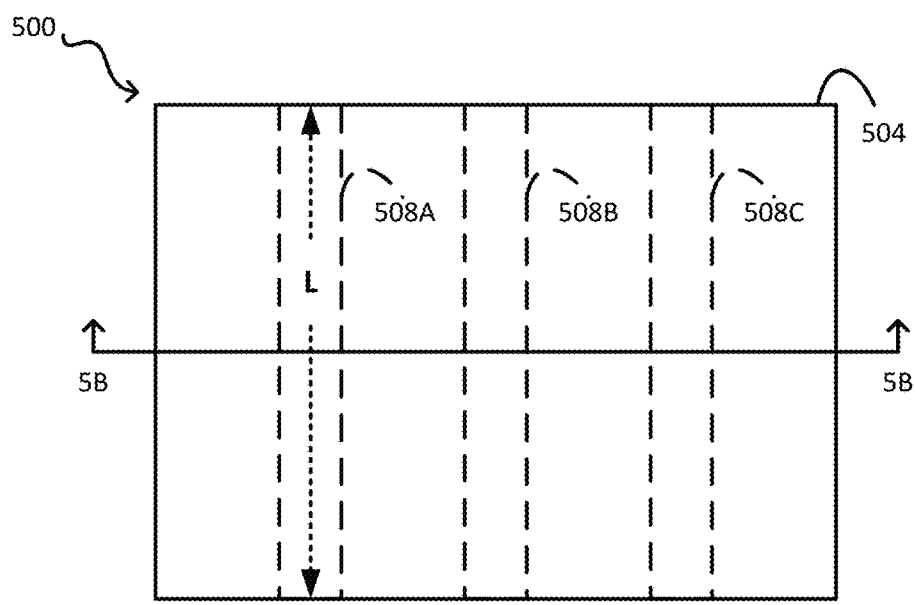
FIG. 5A is a plan view of an example nanofiber assembly in which a nanofiber sheet is in contact with three underlying nanofiber yarns, in an embodiment.

A plan view of one in the embodiment of the present disclosure is schematically illustrated in FIG. 5A. The plan view of FIG. 5A includes an assembly 500 of a nanofiber sheet 504, and a plurality of nanofiber yarns 508A, 508B, and 508C (collectively and generically "508").

The nanofiber sheet 504 can be prepared according to methods described above in the context of FIGS. 1 to 4. That is, the nanofiber sheet 504 can be drawn from a nanofiber forest so that the nanofibers of the forest (initially oriented to have a longitudinal axis perpendicular to a growth substrate) are repositioned into a sheet and reoriented so that longitudinal axes of the nanofibers are parallel to one another and parallel to major surfaces of the nanofiber sheet. This orientation is illustrated in FIGS. 3 and 4. In some examples the thickness of the sheet (indicated as "T" in FIG. 5B) can be less than 1 µm, less than 0.5 µm, or less than 0.1 µm.

The nanofiber yarns 508 can be fabricated by first drawing nanofibers from a nanofiber forest to form a nanofiber sheet or a nanofiber ribbon, as described above. A twisting force can then be applied to the nanofibers in the nanofiber sheet so as to form a nanofiber yarn. The twisting force causes the nanofibers to draw closer to one another and, depending on a length of the nanofibers, to twist around a longitudinal axis. In some examples, the twist can be applied using a "true twist" technique in which one end of the sheet is fixed and an opposing end is rotated in one direction repeatedly so as to impart helical rotation to the yarn. In other examples, twist can be applied using a "false twist" technique in which the twisting force is applied between the two opposing ends of the sheet/yarn. Nanofiber yarns are described in more detail in PCT Publication No. WO 2007/015710 and false twist techniques are described in more detail in U.S. patent application Ser. No. 15/844,756, both of which are in incorporated by reference herein in their entireties.

Regardless of the techniques used to fabricate the nanofiber yarn 508, the nanofiber yarn 508 is placed in (direct or indirect) contact with the nanofiber sheet 504. The contact is such that the nanofiber sheet 504 conforms to at least half of a circumference of at least one nanofiber yarn 508 along at least part of a length L of the nanofiber yarn 508. This arrangement is shown in cross-sectional view FIG. 5B, which is taken at the location indicated in FIG. 5A. It will be appreciated that a width (or, analogously, a diameter) of the nanofiber yarns shown in FIGS. 5A and 5B is not drawn to scale, but rather emphasized for clarity of depiction.

Figure 5B:
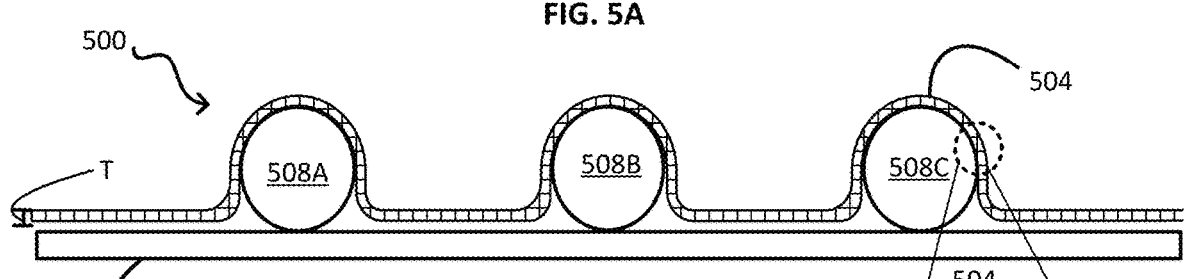
FIG. 5B illustrates a cross-sectional view of the nanofiber assembly of FIG. 5A, in an embodiment.
Figure 5B:
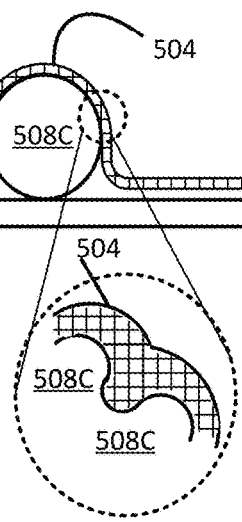
Figure 5C:
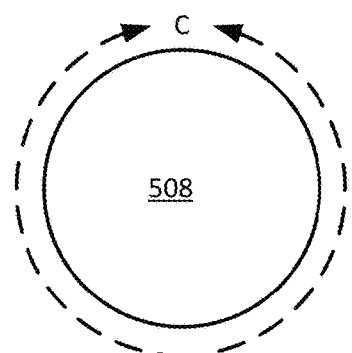
FIG. 5C illustrates a circumference of a nanofiber yarn, in an embodiment.
Figure 5D:
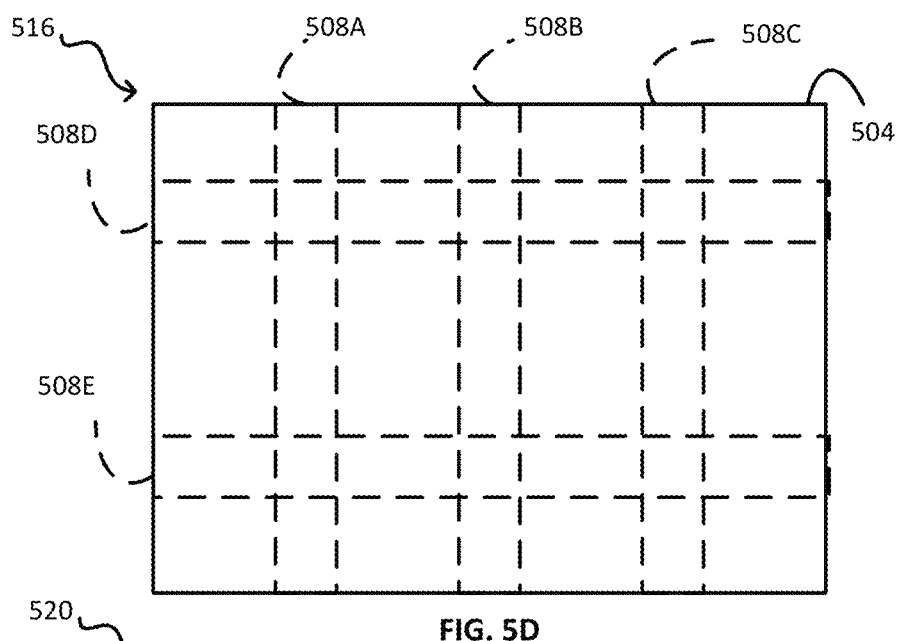
FIGS. 5D-5G schematically illustrate plan views of various alternative configurations of nanofiber yarns within a nanofiber sheet assembly, in embodiments.
Figure 5E:
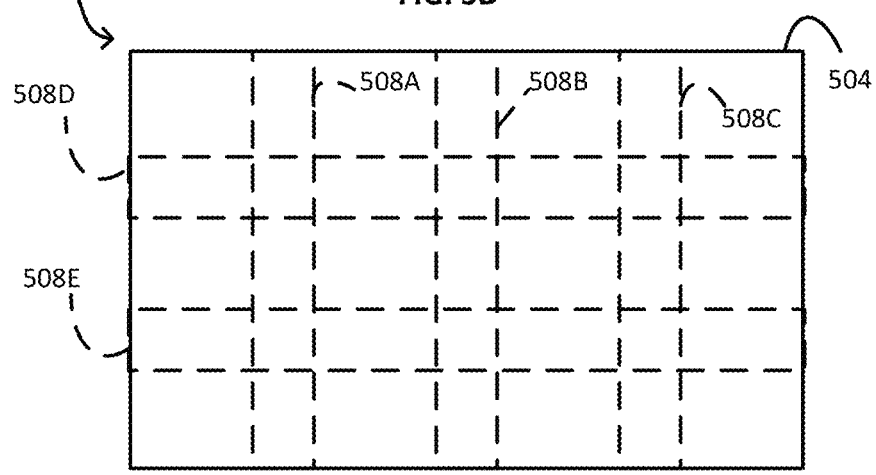
Figure 5F:
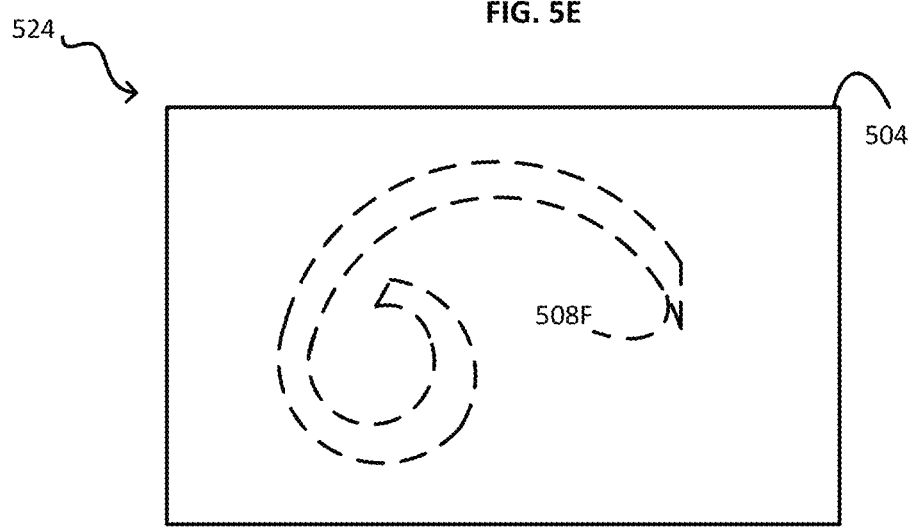
Figure 5G:
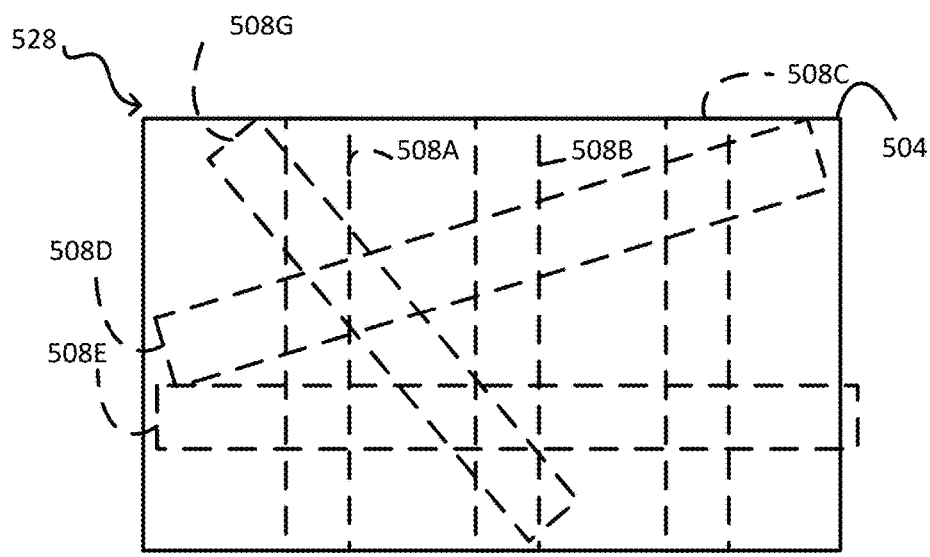

As shown in FIG. 5B the nanofiber yarns 508A, 508B, 508C are disposed on a substrate 512 (included for convenience of illustration). In this example, the nanofiber sheet 504 having a thickness T is disposed in direct contact with at least 50% of the circumference of the nanofiber yarns 508. It will be appreciated that in other embodiments, the direct contact between the nanofiber sheet 504 and the circumference of one or more nanofiber yarns 508 is greater than 10%, 20%, 30%, 40%, 50%, 60%, 70%, 75%, 80%, or 90% and is present along at least a portion of the length L of the yarns 508. For clarity, a circumference dimension C (which is used according to its customary meaning) corresponding to a generic nanofiber yarn 508 is indicated in FIG. 5C. It will be understood that the dashed line indicating the circumference C is offset from the circumference of the yarn itself for clarity of depiction. The amount of contact can be determined by examining an SEM of a cross section of the sheet. Example diameters of the nanofiber yarn 508 can be less than 30 µm, less than 10 µm, less than 5 µm, or less than 1 µm.

While the nanofiber yarns 508 in FIG. 5B are shown as having a uniform circular cross-section, this is merely for convenience of illustration. The nanofiber yarns 508, whether single-ply or multi-ply yarns, have a surface topography corresponding to the twisted fibers within the yarn as well as the twist use to ply single-ply yarns together into a multi-ply yarn. Regardless of the surface topography of the yarns (which can be on the scale of from 0.01 µm to 0.5 µm) the nanofiber sheet 504 conforms to the surface topography. A schematic illustration of this appears in inset magnified view FIG. 5B'.

It will be appreciated that although the assembly 500 is shown to include only three nanofiber yarns 508A, 508B, 508C, an assembly can include any number of nanofiber yarns 508. Furthermore, in the example shown in FIG. 5A, the yarns 508 are shown in a parallel configuration. Other configurations of yarns 508 are illustrated in FIGS. 5D-5G. These alternative configurations include, but are not limited to, a rectangular grid 516 (FIG. 5D), a square grid 520 (FIG. 5E), a spiral grid 524 (FIG. 5F), and an irregular polygon grid 528 (FIG. 5G), among others.

Continuous Network of Infiltrating Material

Figure 6A:
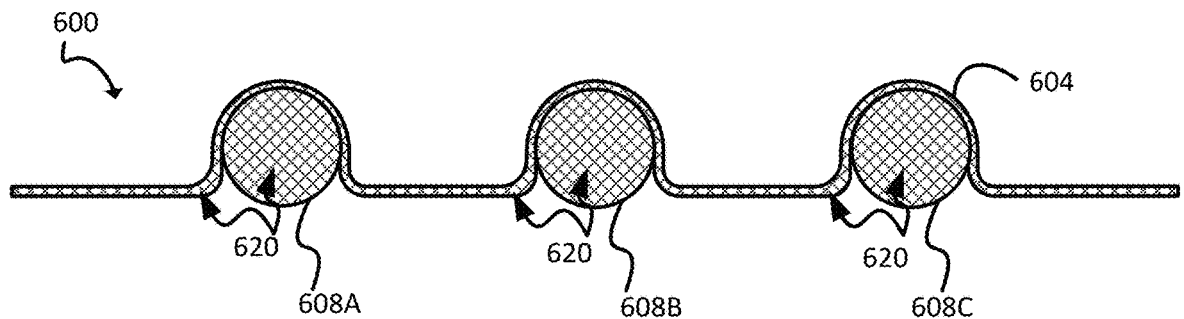
FIG. 6A illustrates a cross-sectional view of an assembly of a nanofiber sheet and nanofiber yarns, in an embodiment.

In an alternate embodiment, FIG. 6A illustrates a cross-sectional view of an assembly 600. The assembly 600 includes a nanofiber sheet 604, a plurality of nanofiber yarns 608A, 608B, and 608C (collectively and generically "608"), and an infiltrating material 620.

The nanofiber sheet 604 and the nanofiber yarns 608 are analogous to those described above and need no further description. Similarly, the direct contact between the nanofiber sheet 604 and the nanofiber yarn 608, and the patterns in which the nanofiber yarns 608 can be arranged are described above and are applicable to the embodiment depicted in FIG. 6A.

In the assembly 600 an infiltrating material 620 is disposed at least within interstitial spaces defined by the nanofibers of the nanofiber sheet 604 and also defined by the nanofiber yarns 608. In some examples, the infiltrating material 620 is disposed within these interstitial spaces so as to form a continuous network throughout both of the nanofiber sheet 604 and the nanofiber yarn 608, thus connecting the nanofiber sheet 604 and the nanofiber yarn 608 together. The presence of the infiltrating material 620 can thus form an additional structure of the assembly 600 that can reduce the likelihood of folding, wrinkling, or tearing of the nanofiber sheet 604, in addition to the benefit provided by the combination of the yarns 608 and the conforming nanofiber sheet 604.

Examples of the infiltrating material 620 include, but are not limited to, a polymer, a solvent, an adhesive, nanoparticles, and combinations thereof. Examples of polymers that can be used as the infiltrating material 620 include thermoplastic polymers, network polymers, which include epoxides and elastomeric network polymers. In the case of elastomeric network polymer, the light cross-linking of the elastomer and the inherent elasticity of the elastomer along with the continuous nature of the elastomeric network between both of the nanofiber yarn 608 and the nanofiber sheet 604 means that the infiltrating material 620 in this case can not only provide elasticity to the assembly 600 but also physical integrity to the assembly 600 that resists disconnection between the nanofiber yarn 608 and the nanofiber sheet 604 when the assembly 600 is stretched.

Figure 6B:
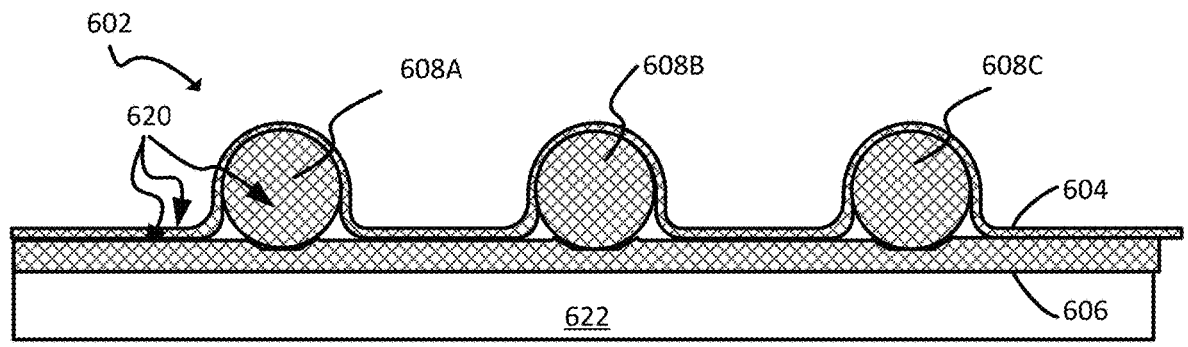
FIG. 6B illustrates a cross-sectional view of an assembly of nanofiber yarns between nanofiber sheets, the assembly optionally disposed on a polymer sheet, in an embodiment.

As shown in FIG. 6B, some embodiments include a second nanofiber sheet 606 whose addition forms an assembly 602. The second nanofiber sheet 606 can be attached to the nanofiber sheet 604 and the nanofiber yarns 608 so that the sheets 604, 606 have direct with at least 75% or at least 90% of the circumference of the nanofiber yarn. While the second nanofiber sheet 606 can also include the infiltrating material 620 (as shown) this need not be the case. The assembly 602 is also shown mounted on an optional polymer sheet 622.

Method

Figure 7:
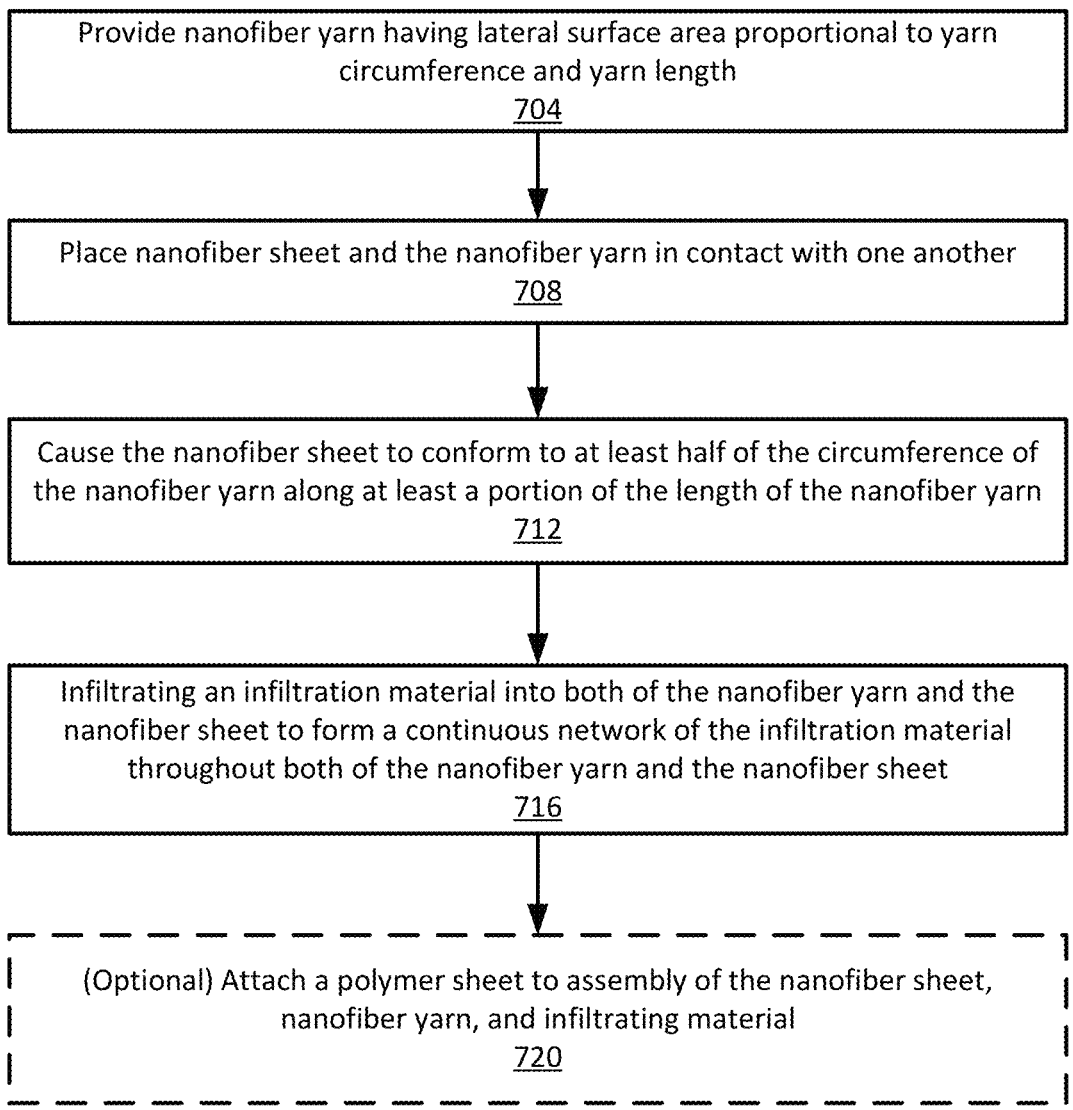
FIG. 7 is a flow diagram illustrating an example method for fabricating nanofiber sheet assemblies, in an embodiment.

FIG. 7 illustrates a method 700 for fabricating a nanofiber sheet composite comprising nanofiber yarns and the nanofiber sheet as described above. A nanofiber yarn is provided 704. As indicated above, the nanofiber yarn has a lateral surface area that is proportional to the yarn circumference and the yarn length. A nanofiber sheet is placed 708 in contact (direct or indirect contact) with the nanofiber yarn. The nanofiber sheet is then caused 712 to conform to an external surface of the yarn corresponding to at least half of the circumference of the nanofiber yarn and along at least a portion of the length of the nanofiber yarn. Conforming the nanofiber sheet to the external surface of the yarn can be caused 712 by, for example, applying pressure to one or more of the nanofiber sheet and/or the nanofiber yarn. This can include applying a positive pressure (e.g., compression using a low surface-energy surface) or applying a negative pressure (e.g., a vacuum) to one side of the nanofiber sheet so as to draw the nanofiber sheet toward the nanofiber yarns. Other techniques for causing 712 the nanofiber sheet to conform to the surface of the nanofiber yarn will be appreciated in light of the present disclosure.

An infiltration material is then infiltrated 716 into one or both of the nanofiber yarn and the nanofiber sheet. This infiltration causes a continuous network of the infiltration material to form throughout both the nanofiber yarn and the nanofiber sheet. The continuous network of the infiltrating material is disposed in a first plurality of interstitial spaces defined by the nanofibers within the nanofiber yarn and also disposed within the second plurality of interstitial spaces defined by nanofibers within the nanofiber sheet. This is shown schematically in FIG. 6A.

Infiltration 716 of the infiltration material can be accomplished by providing a fluid to the nanofiber sheets. Examples of fluids include polymers, polymers solvated in a solvent, polymers solvated in a solvent with nanoparticles suspended therein, among others.

Optionally, the method 700 can continue by attaching 720 a polymer sheet to the nanofiber sheet, nanofiber yarn, and infiltrating material, as shown in FIG. 6B. The polymer sheet can be integrated into the nanofiber sheet by, for example, raising the temperature to above the glass transition point of the polymer or adding a solvent capable of softening the polymer.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber sheet assembly comprising:
  a nanofiber yarn having a circumference and a length;
  a nanofiber sheet in direct contact with the nanofiber yarn; and
  an infiltrating material disposed within the nanofiber yarn and the nanofiber sheet, wherein the nanofiber yarn has a surface topography corresponding to twisted fibers within the nanofiber yarn and at least a portion of the nanofiber sheet conforms to a surface topography of the nanofiber yarn, the nanofiber sheet having surface indentations in at least one of an inner surface and an outer surface of the nanofiber sheet, and
  nanofibers of the nanofiber sheet are aligned substantially parallel to one another along their longitudinal axes and end-to-end in a plane that is parallel to the inner and outer surfaces of the nanofiber sheet.

2. The nanofiber sheet assembly of claim 1, wherein the nanofiber sheet is in direct contact with at least half of the circumference of the nanofiber yarn along at least some of the length of the nanofiber yarn.

3. The nanofiber sheet assembly of claim 1, wherein the nanofiber sheet assembly is configured to be resistant to one or more of folding, wrinkling, and tearing.

4. The nanofiber sheet assembly of claim 1, wherein the nanofiber sheet is in direct contact with at least 75% of the circumference of the nanofiber yarn.

5. The nanofiber sheet assembly of claim 1, wherein the nanofiber sheet is in direct contact with at least 90% of the circumference of the nanofiber yarn.

6. The nanofiber sheet assembly of claim 1, wherein the nanofiber yarn comprises a plurality of single-ply nanofiber yarns, multi-ply nanofiber yarns, or both.

7. The nanofiber sheet assembly of claim 1, wherein the infiltrating material is disposed within a first plurality of interstitial spaces defined by nanofibers within the nanofiber yarn and within a second plurality of interstitial spaces defined by nanofibers within the nanofiber sheet.

8. The nanofiber sheet assembly of claim 7, wherein the infiltrating material forms a continuous network connecting the nanofiber yarn and the nanofiber sheet.

9. The nanofiber sheet assembly of claim 1, wherein the infiltrating material is a polymer.

10. The nanofiber sheet assembly of claim 9, wherein the polymer is an elastomeric network polymer.

11. The nanofiber sheet assembly of claim 1, wherein the nanofiber sheet is a first nanofiber sheet in contact with a first portion of the circumference of the length of the nanofiber yarn and a second nanofiber sheet in contact with a second portion of the circumference of the length of the nanofiber yarn, the first portion and the second portion comprising greater than 95% of the circumference.

12. The nanofiber sheet assembly of claim 1, further comprising a polymer sheet connected to an assembly of the nanofiber yarn, the nanofiber sheet, and the infiltrating material.

13. The nanofiber sheet assembly of claim 1, wherein a thickness of the nanofiber sheet is less than 0.1 µm.

14. The nanofiber sheet assembly of claim 1, wherein a diameter of the nanofiber yarn is less than 5 µm.

15. The nanofiber sheet assembly of claim 1, wherein the infiltrating material is disposed within the nanofiber yarn and the nanofiber sheet through an infiltration process, wherein the infiltration process comprises providing a fluid selected from at least one of: a polymer, a polymer solvated in a solvent, and a polymer solvated in a solvent with nanoparticles suspended therein.

16. The nanofiber sheet assembly of claim 1, further comprising:
the nanofiber yarn forming a corresponding elongated depression in the inner surface of the nanofiber sheet and a corresponding elongated protuberance on the outer surface of the nanofiber sheet.

17. A nanofiber sheet assembly comprising:
a nanofiber yarn having a circumference and a length;
a nanofiber sheet in direct contact with the nanofiber yarn; and
an infiltrating material disposed within the nanofiber yarn and the nanofiber sheet, wherein the nanofiber yarn comprises a plurality of nanofiber yarns arranged into a spaced parallel array, and
nanofibers of the nanofiber sheet are aligned substantially parallel to one another along their longitudinal axes and end-to-end in a plane that is parallel to inner and outer surfaces of the nanofiber sheet,
wherein the nanofiber sheet is in direct contact with at least half of the circumference of the nanofiber yarn along at least some of the length of the nanofiber yarn.

18. A nanofiber sheet assembly comprising:
a nanofiber yarn having a circumference and a length;
a nanofiber sheet in direct contact with the nanofiber yarn; and
an infiltrating material disposed within the nanofiber yarn and the nanofiber sheet, wherein the nanofiber yarn comprises a plurality of nanofiber yarns woven into an orthogonal array, and
nanofibers of the nanofiber sheet are aligned substantially parallel to one another along their longitudinal axes and end-to-end in a plane that is parallel to inner and outer surfaces of the nanofiber sheet.

19. A method for fabricating a nanofiber sheet assembly comprising:
providing a nanofiber yarn having a circumference and a length;
placing a nanofiber sheet and the nanofiber yarn in contact with one another, wherein the nanofiber yarn has a surface topography corresponding to twisted fibers within the nanofiber yarn and at least a portion of the nanofiber sheet conforms to a surface topography of the nanofiber yarn, the nanofiber sheet having surface indentations in at least one of an inner surface and an outer surface of the nanofiber sheet; and
forming nanofibers of the nanofiber sheet to be aligned substantially parallel to one another along their longitudinal axes and end-to-end in a plane that is parallel to inner and outer surfaces of the nanofiber sheet, and
infiltrating an infiltration material into both of the nanofiber yarn and the nanofiber sheet to form a continuous network of the infiltration material throughout both of the nanofiber yarn and the nanofiber sheet.

20. The method of claim 19, further comprising causing the nanofiber sheet to conform to at least half of the circumference of the nanofiber yarn along at least a portion of the length of the nanofiber yarn.

21. The method of claim 20, wherein causing the nanofiber sheet to conform includes causing the nanofiber sheet to conform to a surface topography of the nanofiber yarn.

22. The method of claim 19, wherein the infiltrating comprises infiltrating the infiltration material within a first plurality of interstitial spaces defined by nanofibers within the nanofiber yarn and a within a second plurality of interstitial spaces defined by nanofibers within the nanofiber sheet.

* * * * *